Figure 1:
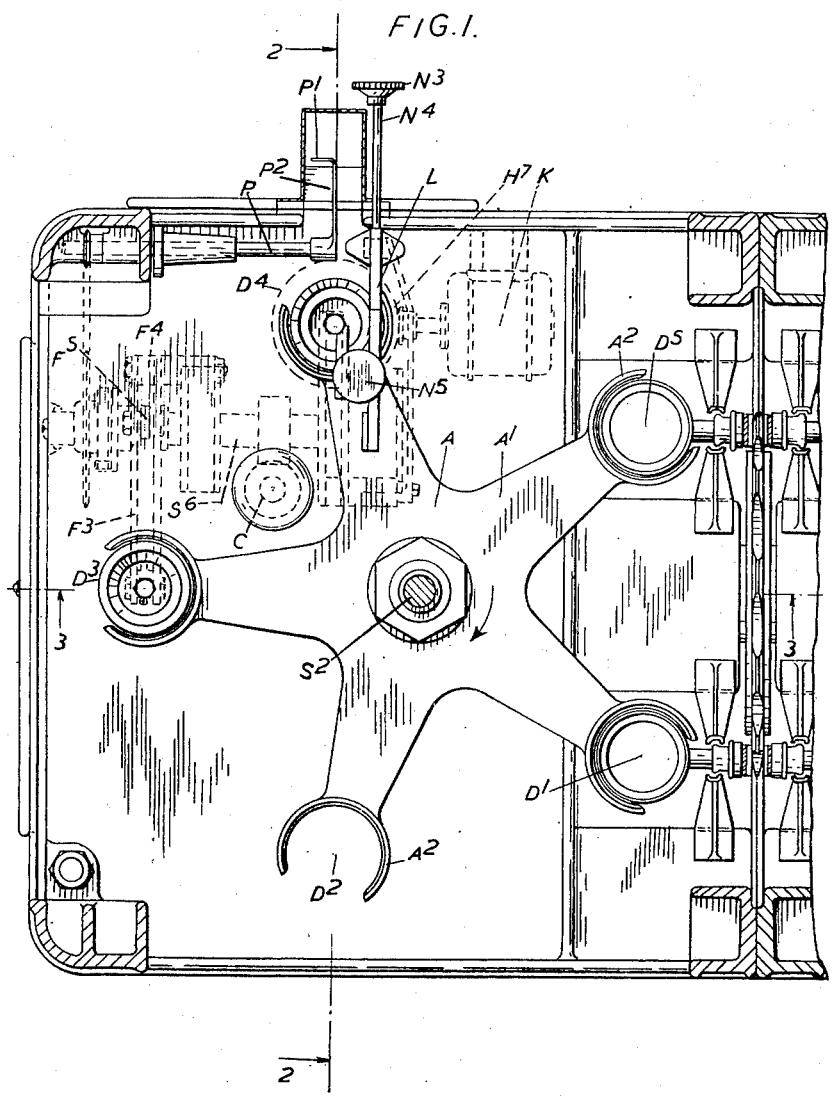

Jan. 2, 1951          A. GUY ET AL          2,536,364

JIGGER FOR SHAPING POTTERY ARTICLES

Filed Dec. 14, 1948          4 Sheets-Sheet 1

Inventors

A. Guy and C. T. Wedgwood
By Emery Holcombe & Blau
Attorneys

Jan. 2, 1951  A. GUY ET AL  2,536,364
JIGGER FOR SHAPING POTTERY ARTICLES
Filed Dec. 14, 1948  4 Sheets-Sheet 3

Inventors

A. Guy and C.T. Wedgwood
By Emery, Holcombe + Blau
Attorneys

Jan. 2, 1951 A. GUY ET AL 2,536,364
JIGGER FOR SHAPING POTTERY ARTICLES
Filed Dec. 14, 1948 4 Sheets-Sheet 4

Inventors
A. Guy and C.T. Wedgwood
By Emery, Halcombe & Blair
Attorneys

Patented Jan. 2, 1951

2,536,364

UNITED STATES PATENT OFFICE 2,536,364

JIGGER FOR SHAPING POTTERY ARTICLES

Archibald Guy, Leeds, and Clement Tom Wedgwood, Stoke-on-Trent, England, assignors to Sulzer Bros. (London) Limited, London, England, a company of Great Britain, and Josiah Wedgwood & Sons Limited, Stoke-on-Trent, England, a company of Great Britain Application December 14, 1948, Serial No. 77,122
In Great Britain October 15, 1947

5 Claims. (Cl. 25—24)

This invention relates to jigger apparatus for shaping articles of pottery and has for its object to provide jigger apparatus capable of shaping automatcially hollow articles of pottery such as cups and bowls.

To this end a jigger for shaping hollow articles of pottery according to the present invention includes a rotary ram adapted to support and lift a mould containing a roughly hollowed out article of pottery in a plastic state into proximity to a non-rotating knife so that the knife enters the mould and engages the interior of the roughly hollowed out article to shape it by skimming clay therefrom, after which the ram lowers the mould, and means for removing accumulated clay from the knife after such operation.

Preferably the jigger apparatus includes mechanism for rough shaping the pottery article before it is further shaped by the knife. Thus, jigger apparatus according to the invention may conveniently comprise a rotary support or table having a series of circumferentially spaced sockets adapted to carry moulds in which the hollow articles are to be formed, step by step mechanism for rotating the rotary support so that each socket occupies in turn a number of stations, and means at one station for depositing in each mould a charge of clay while at the next is a ram adapted to lift the mould containing the charge of clay into such proximity to a die that the die enters the mould and presses the clay into rough hollow form within the mould, and at the next a rotating ram adapted to lift and rotate the mould carrying the roughly shaped clay into proximity with a non-rotating knife so that the knife enters the mould and engages the interior of the roughly shaped clay to shape it more completely by skimming or cutting clay therefrom, after which the ram lowers the mould onto the support, and means come into operation for removing accumulated clay from the knife.

It will be understood that the stations specifically referred to above in which the clay is operated upon are in addition to a receiving station at which the moulds are deposited in the sockets upon the support and a discharge station at which the moulds containing the hollow articles are removed from the sockets on the support.

The means for cleaning the stationary knife after each shaping operation may vary but in one convenient form comprises a scoop like member mounted to rotate about a horizontal axis and arranged so that on rotation its edge passes upwardly close to the surface of the knife on which clay tends to accumulate, so that it removes such clay from the knife and carries it outwards and away from the knife to a discharge point at the side of the axis of the cleaning device remote from the knife at which point it will be appreciated that the scoop like device is inverted so that any clay therein will tend to fall therefrom. The scoop like device conveniently normally occupies the discharge position and is rotated through 360° each time a knife cleaning operation is to be performed.

Figure 2:
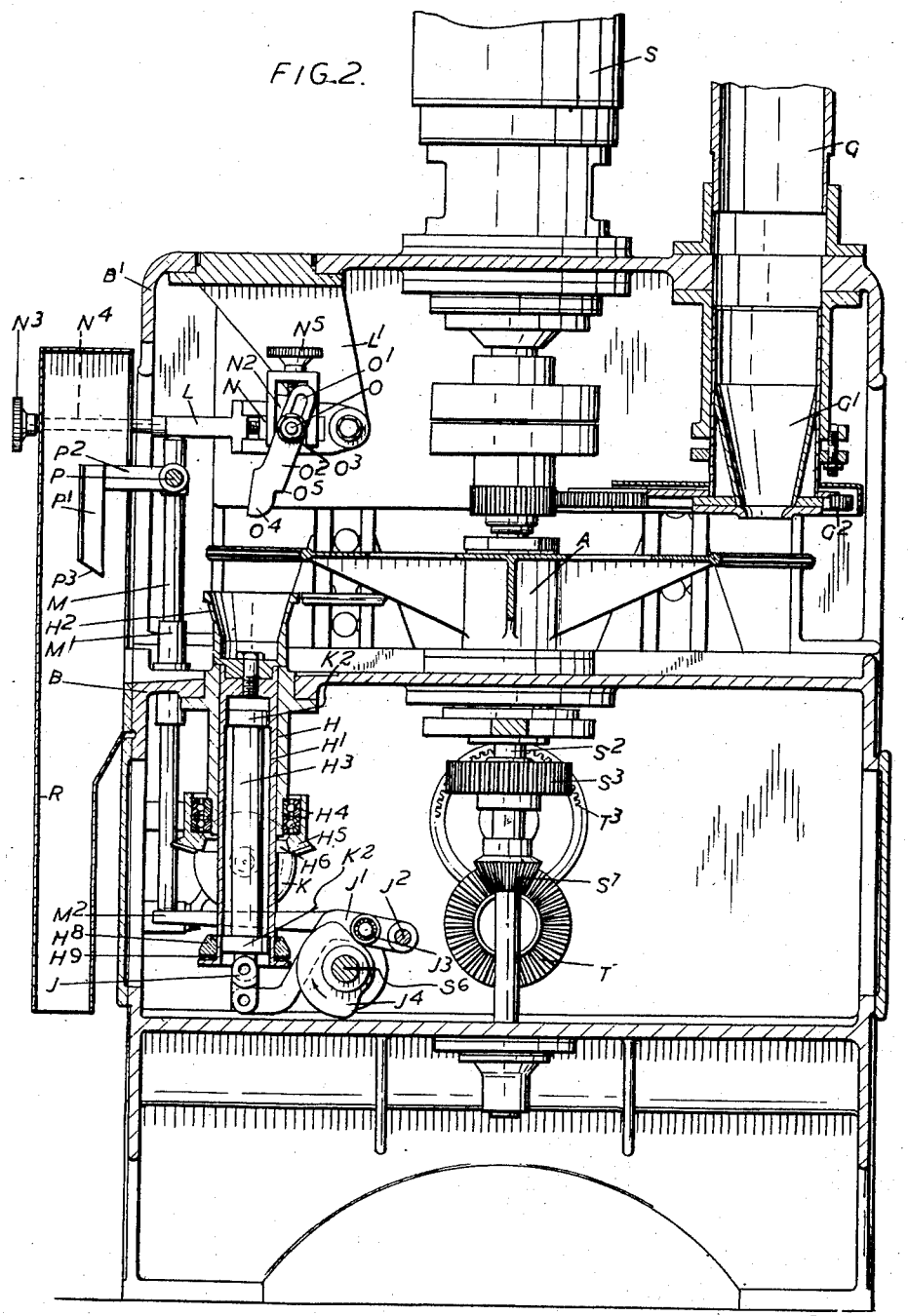
Figure 3:
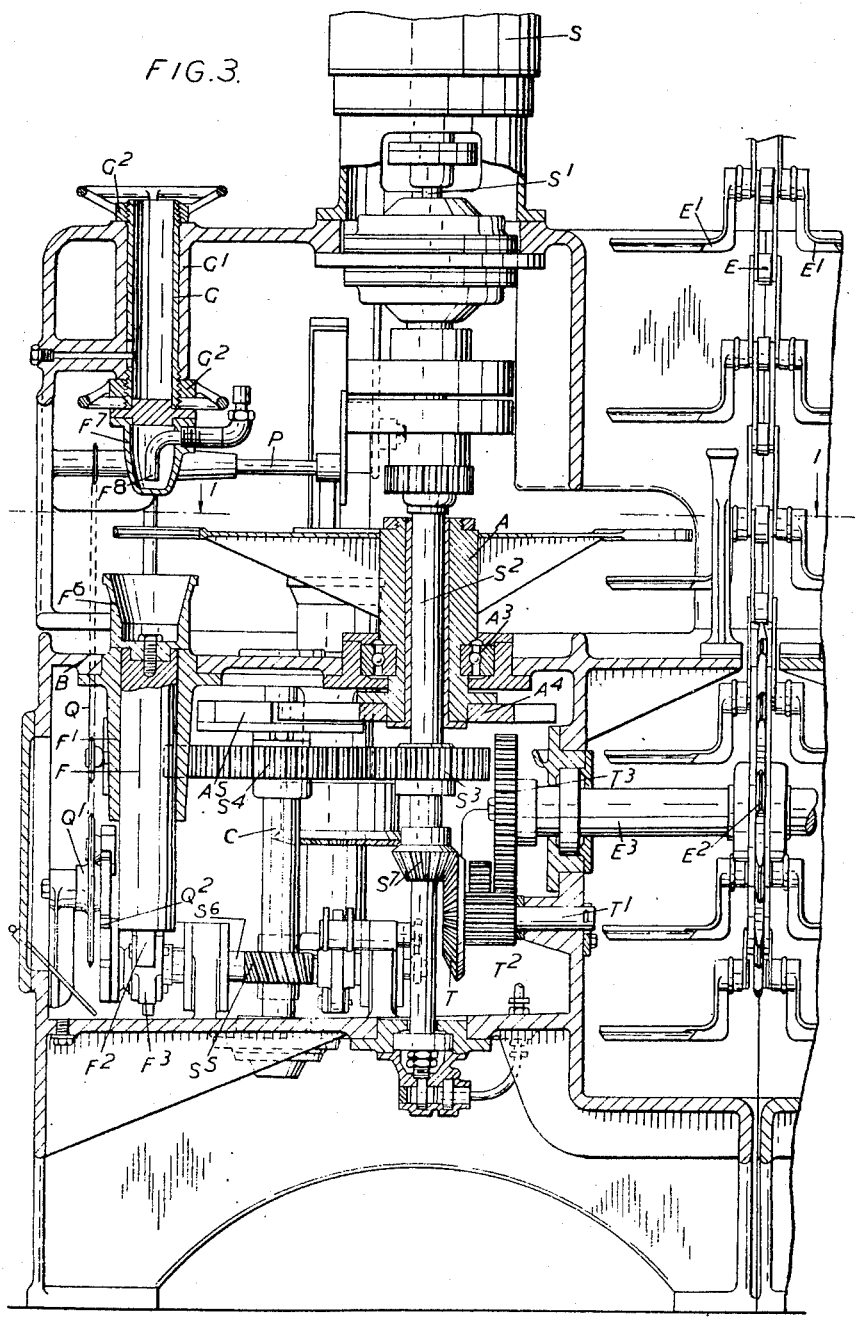
Figure 4:
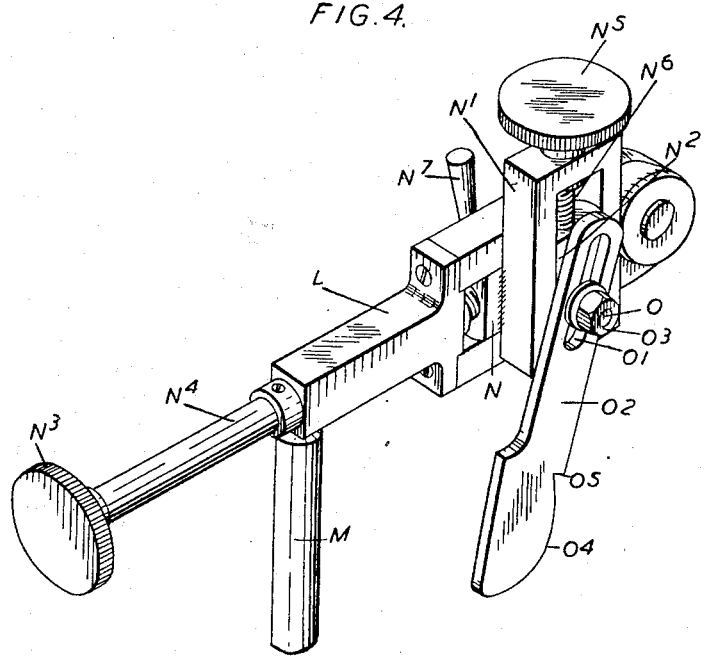

The invention may be carried into practice in various ways but one construction of apparatus according to the invention is illustrated by way of example in the accompanying drawings in which, Figure 1 is a sectional plan on the line I—I of Figure 3, Figure 2 is a sectional side elevation on the line 2—2 of Figure 1, Figure 3 is a sectional side elevation on the line 3—3 of Figure 1, and Figure 4 is a perspective view of the skimming knife and its adjustable supporting mechanism.

In the construction illustrated the apparatus comprises a feed device in the form of a head A carrying five radial arms $A^1$ the outer end of each of which carries a horseshoe-shaped socket $A^2$ adapted to receive a mould in which a pottery article is to be formed. The head A is mounted in bearings $A^3$ in a supporting frame B and Geneva or like mechanism is provided for imparting step by step rotational movement to the head so that each of the sockets $A^2$ is moved in turn into a series of five stations. The Geneva mechanism is of known type and comprises a slotted disc $A^4$ secured to the lower end of the head A and engaged by a continuously rotating driving element $A^5$ of known type mounted upon the upper end of a shaft C supported in bearings in the frame B. The five stations, which are most clearly shown in Figure 1, comprise a receiving station $D^1$ in which a mould is deposited in each socket $A^2$, a clay supply station $D^2$ in which an appropriate volume of clay is deposited upon the mould, a rough forming station $D^3$ in which the clay is roughly formed into the shape of the pottery article to be made, a finishing station $D^4$ in which a further shaping operation is applied to the clay and a discharge station $D^5$ in which the mould carrying the shaped clay thereon is removed from each socket $A^2$. It will thus be seen that the receiving station $D^1$ and the discharge station $D^5$ lie adjacent to one another.

The moulds are deposited in the sockets $A^2$ at the station $D^1$ and are subsequently removed from these sockets at the station $D^5$ by a single vertical chain conveyor comprising a chain E carrying pivoted thereto spaced laterally-extending mould supports $E^1$, and a sprocket wheel $E^2$ around which the chain passes at a point below the head A, the sprocket $E^2$ being mounted on a shaft $E^3$ supported in bearings in the frame B and interconnected by gearing hereinafter described with the shaft C so that the conveyor is moved in synchronism with the operation of the Geneva mechanism $A^4$, $A^5$. The arrangement and the disposition of the conveyor is such that during each period of rest of the head A one of the mould supports $E^1$ passes through the socket $A^2$ in the station $D^1$ so as to deposit a mould therein while another of the mould supports $E^1$ passes upwards through the socket $A^2$ at the station $D^5$ to remove a mould therefrom, each movement of the head $A^1$ taking place while the mould supports $E^1$ are out of the plane of the arms $A^1$.

The apparatus for depositing an appropriate quantity of clay on each mould when it occupies the station $D^2$ may comprise a pugmill (not shown) including vertical screw conveyor apparatus for delivering the clay through a passage G to a discharge nozzle $G^1$ at a predetermined speed, combined with a cutting device, indicated at $G^2$, which automatically cuts off an appropriate length of clay while each mould is in the station $D^2$. The details of the pugmill and cutting device form in themselves no part of the present invention and may be of known type and will not, therefore, be further described.

The device for performing the rough shaping operation on the clay when each mould occupies the station $D^3$ comprises a ram F mounted to move vertically in a guide $F^1$ carried by the frame B, the lower end of the ram F being connected by a link, indicated at $F^2$, to one end of an arm $F^3$ the other end of which is pivoted at $F^4$ to a fixed point while an intermediate point of the arm $F^3$ carries a roller $F^5$ acted upon by a cam on a shaft $S^6$, so that during the period when each mould occupies the station $D^5$ the ram F is raised and then lowered. The upper end of the ram F carries a socket $F^6$ which is adapted to engage, contain and raise the mould from the socket $A^2$ in the station $D^3$ when the ram F rises. Immediately above the ram F and the socket $A^2$ at the station $D^3$ is a hollow die $F^7$ adapted to be heated by fluid in known manner delivered through a pipe $F^8$. The die $F^7$ is rigidly mounted on the lower end of a tubular support G mounted in a tubular housing $G^1$ forming part of the frame B and capable of being vertically adjusted and locked in its position of adjustment by two locating and locking wheels $G^2$.

The arrangement is such that when the mould is raised by the socket $F^6$, the clay therein is brought into contact with the heated die $F^7$ and thereby roughly shaped internally. The mould is then again lowered into the socket $A^2$ before the head A is moved on to carry the mould into station $D^4$.

Mounted to move vertically in a tubular guide H rigidly mounted in the frame B at the station $D^4$ is a second ram $H^1$ the upper end of which carries a socket $H^2$ similar to the socket $F^6$. The ram $H^1$ is tubular and has mounted within it on bearings $K^2$ a shaft $H^3$ the lower end of which is connected by a link J to the free end of an arm $J^1$ which is pivoted about a fixed axis at $J^2$ and carries a roller $J^3$ engaging a cam $J^4$ on the shaft $S^6$. Thus the ram $H^1$ can be raised by operation of the cam $J^4$ through the roller $J^3$ on the arm $J^1$ while moreover the ram $H^1$ is free to rotate in the guide H relatively to the shaft $H^3$. Mounted in bearings $H^4$ upon the lower end of the guide H is a bevel wheel $H^5$ which is formed conical internally as shown at $H^6$ to constitute the inner member of a cone clutch. The bevel wheel $H^5$ is constantly driven by a bevel wheel $H^7$ on the shaft of an electric motor K and an inner cone clutch member $H^8$ is mounted upon the lower end of the ram $H^1$.

The arrangement is such that the cam $J^4$ operating through the roller $J^3$, the arm $J^1$ and the link J on the shaft $H^3$ raises the ram $H^1$ during each period when a socket $A^2$ occupies station $D^4$ and then lowers the ram $H^1$ before the head A again moves. Each time the ram $H^1$ is so raised the clutch cone $H^8$ comes into engagement with the co-operating clutch surface $H^6$ towards the end of the upward movement of the ram $H^1$, the clutch cone $H^8$ being capable of limited downward movement relatively to the ram $H^1$ against the action of springs indicated at $H^9$ so that the ram $H^1$ can move upwards to a limited further extent after the clutch members engage one another. Thus during the period when each mould occupies the station $D^4$ it is lifted by the socket $H^2$ from its socket $A^2$, rotated in its lifted position and then again lowered into its socket $A^2$ before the head A again moves.

Disposed above the head A in the station $D^4$ is apparatus for performing a finishing operation on the roughly shaped clay in the mould. This apparatus comprises a substantially horizontal arm L pivoted to a bracket $L^1$ secured to a superstructure $B^1$ forming an upward extension of the frame B, the arm L resting upon the upper end of a push rod M mounted to slide vertically in a guide $M^1$ in the frame B. The lower end of the push rod M rests upon the end of a tappet lever $M^2$ pivoted on the axis $J^2$ and also actuated by a cam on the shaft $S^6$ so that when this cam lifts the lever $M^2$ and hence the rod M the arm L is also lifted against the action of its weight. The arm L is formed to support an adjustable slide rest comprising a horizontally sliding member N which is arranged to slide in a longitudinal slot formed in the arm L and carries a vertical guide $N^1$ in a slot in which is adjustably mounted a vertically sliding block $N^2$. The block N is adjustable in its slot by means of a handwheel $N^3$ mounted upon a screw threaded rod $N^4$ rotatable in the arm L and engaging a screw threaded bore in the block $N^2$ while the block $N^2$ is adjustable in its slot by a handwheel $N^5$ mounted upon a screw threaded rod $N^6$ carried in bearings in the guide $N^1$ and engaging a screw threaded bore in the block $N^2$. The relatively moving parts of the adjustable slide rest thus provided can all be frictionally locked in their adjusted positions by a lever $N^7$.

Projecting from the block $N^2$ is a bolt O which passes through a slot $O^1$ in a tool $O^2$ by which the tool can be secured in any desired appropriate angular position to the block $N^2$. The tool $O^2$ is in the form of a curved knife the operative edge $O^4$ of which has approximately the contour desired for the interior of the pottery article to be formed.

The arrangement is such that while each mould is raised and brought into rotation by the ram $H^1$ the knife $O^4$ occupies a position in which it will not come into contact with the interior of the roughly formed clay in the mould. As soon as the mould is rotating in its uppermost position the lever $M^2$ is permitted to fall by the cam acting thereon and thus permits the rod M and the arm L to fall thus bringing the edge $O^4$ of the knife $O^2$ progressively into engagement with the inner surface of the roughly formed clay in the mould so that the knife skims clay from the interior of the roughly formed clay and thus shapes it to approximately the final form of the desired pottery article. At the same time an upper edge portion $O^5$ of the knife conveniently skims clay from the upper edge of the roughly formed pottery article to provide at least rough finishing for this upper edge. The ram $H^1$ then descends and the rod M is lifted by the lever $M^2$ in readiness for performing a similar operation on the clay within the next mould to come into station $D^4$.

Pivotally mounted in the superstructure $B^1$ upon a shaft P is a knife-cleaning scoop $P^1$ of trough like form carried upon an arm $P^2$. The lip $P^3$ of the scoop $P^1$ is adapted when the scoop is rotated about the axis P in the direction of the arrow to pass close to the operative edge $O^4$ of the knife $O^2$ so as to scrape therefrom into the scoop $P^1$ any clay which has accumulated on the knife $O^2$. The arm $P^2$ is rigidly connected to the shaft P and the latter is intermittently rotated by transmission mechanism comprising a chain Q connecting a sprocket on the shaft P to a sprocket $Q^1$ which is driven by Geneva mechanism $Q^2$ from the shaft $S^6$ so that the scoop $P^1$ performs one complete revolution between consecutive skimming operations performed by the knife $O^2$.

Secured to the frame B is a chute R into which the scoop $P^1$ empties the clay which it scrapes from the knife $O^2$.

The gearing by which the various parts of the apparatus are driven is as follows.

Mounted upon the superstructure $B^1$ is an electric motor S the shaft $S^1$ of which is coupled to the upper end of a shaft $S^2$ passing through a bearing in the head A. The shaft $S^2$ carries at a point below the head A a gear wheel $S^3$ which meshes with a gear wheel $S^4$ on the shaft C whereby the Geneva mechanism $A^5$, $A^4$ is operated. The shaft C also carries a skew gear $S^5$ which meshes with a skew gear on the shaft $S^6$ and thus drives the cam mechanism for raising and lowering the rams F and $H^1$ and also the mechanism for operating the knife $O^2$ and the scoop $P^1$.

Also mounted upon the shaft $S^2$ is a bevel gear $S^7$ which meshes with a bevel gear T on a shaft $T^1$. The shaft $T^1$ also carries a spur gear $T^2$ which meshes with a gear $T^3$ on the shaft $E^3$ by which the conveyor chain E is driven.

As stated above the bevel wheel $H^5$ is driven by the separate electric motor K.

In the arrangement shown the conveyor chain E is of duplex form, that is to say has mould supports $E^1$ projecting from each side of it and in this construction the mechanism illustrated and described above as situated on the lefthand side of the conveyor chain in Figure 3 would be duplicated but in the form of a "mirror image" on the righthand side of the conveyor chain so that the same functions would be performed in connection with the moulds carried to and from the machine by all the mould carriers on the conveyor chain.

What we claim as our invention and desire to secure by Letters Patent is:

1. A jigger for shaping hollow articles of pottery from plastic material including in combination a rotatable vertically movable ram adapted to support and lift a mould containing a roughly hollowed out article of pottery in a plastic state, means for raising and lowering the ram, means for rotating the ram when in the raised position, a non-rotating knife which lies in proximity to the inner surface of the mould when the mould is in its raised position and engages the interior of the roughly hollowed out article of pottery to shape it by removal of plastic material therefrom, and upwardly swinging means adapted to wipe the face of said knife for removing accumulated plastic material therefrom and away from the mould after each shaping operation, said means operating upwards during the period when the ram is in its lowered position.

2. A jigger as claimed in claim 1 in which the cleaning device for the knife comprises a scoop-like member mounted to rotate about a horizontal axis and the edge of which during the ascending portion of such rotation passes close to the surface of the knife on which clay tends to accumulate, to remove such clay and carry it to a discharge point on the side of the axis of the cleaning device remote from the knife.

3. A jigger as claimed in claim 2 in which the scoop-like device is intermittently rotated through approximately 360° and normally occupies its discharging position.

4. A jigger as claimed in claim 1 including mechanism for moving the knife in a predetermined path while the ram is in its raised position and rotating to bring the knife into engagement with the plastic material in the mould.

5. A jigger for shaping hollow articles of pottery from plastic material comprising a mould in which the hollow articles are to be formed, a vertically movable rotatable ram adapted to support and lift the mould, means for raising and lowering said ram, means for rotating said ram when it is in its raised position, a non-rotary knife disposed above said ram and into proximity to which the inner surface of the mould is brought by the ram when in its raised position and which skims plastic material from the interior of the roughly shaped plastic material in the mould to shape it more completely by removal of plastic material, and means for removing accumulated plastic material from the knife after each shaping operation during the period when the said ram is in its lowered position comprising a mechanical cleaning device in the form of a scoop-like member mounted for revolution in a vertical plane passing flatwise along the face of the knife, and means for causing said scoop-like member to perform one revolution after each forming operation to scrap clay from said knife by upward movement and discharge it to the descending side of its movement.

ARCHD. GUY.
CLEMENT TOM WEDGWOOD.

REFERENCES CITED

The following references are of record in the file of this patent:

UNITED STATES PATENTS

| Number | Name | Date |
| --- | --- | --- |
| 641,072 | Briggs | Jan. 9, 1900 |
| 1,268,984 | McCormick | June 11, 1918 |
| 2,029,084 | Schmidt | Jan. 28, 1936 |
| 2,293,070 | Miller et al. | Aug. 18, 1942 |